(12) United States Patent
Gottfried (10) Patent No.: US 8,853,977 B1
(45) Date of Patent: Oct. 7, 2014

(54) SPHERICAL MECHANICAL ENERGY ACCUMULATOR TO REDUCE BURSTS AND DAMAGE CAUSED BY BURSTS

(76) Inventor: Mario H. Gottfried, Mexico (MX)

( * ) Notice: Subject to any disclaimer, the term of this patent is extended or adjusted under 35 U.S.C. 154(b) by 195 days.

(21) Appl. No.: 13/525,977

(22) Filed: Jun. 18, 2012

Related U.S. Application Data (60) Provisional application No. 61/499,888, filed on Jun. 22, 2011.

(51) Int. Cl.
*H02K 7/02* (2006.01)
(52) U.S. Cl.
USPC .............. 318/150; 318/161; 318/45; 322/14; 74/572.1; 123/179.1
(58) Field of Classification Search
CPC ........ B60K 6/105; B60K 6/10; F16F 15/315; F16F 15/30; H02K 7/025; H02K 7/00; H02K 7/02; Y02E 60/16; Y02T 10/6204
USPC ....................... 318/150, 161; 322/4; 74/572.1
See application file for complete search history.

(56) References Cited

U.S. PATENT DOCUMENTS

| | | | | |
|---|---|---|---|---|
| 4,498,015 A * | 2/1985 | Gottfried | ......................... | 290/15 |
| 5,559,381 A * | 9/1996 | Bosley et al. | ................... | 310/74 |
| 6,232,671 B1 * | 5/2001 | Gottfried, Jr. | ................. | 290/1 R |
| 6,563,229 B2 * | 5/2003 | Farkas | ........................ | 290/30 A |
| 6,870,277 B2 * | 3/2005 | Pavlykivskyj | ................ | 290/1 R |

* cited by examiner

*Primary Examiner* — Rita Leykin
(74) *Attorney, Agent, or Firm* — Egbert Law Offices, PLLC (57) ABSTRACT

A mechanical energy accumulator, suitable for being mounted in a vehicle has a spherical housing with three pairs of flywheel assemblies mounted therein. Each of the pair of flywheel assemblies is rotatable in opposite directions about a respective axis. Each of the axes are perpendicular to one another. At least one permanent magnet motor is mounted within the flywheel assemblies. Each of the flywheels of the flywheel assemblies has a double conical flywheel base, a motor-generator suitable for driving the double conical flywheel base, and a flywheel lid covering the motor-generator. The mechanical energy accumulator may be mounted in a shell having an expansion member. The mechanical energy accumulator has a strong side and a weak side due to varying retention strength of windings therearound so as to create a controlled burst.

15 Claims, 5 Drawing Sheets

SPHERICAL MECHANICAL ENERGY ACCUMULATOR TO REDUCE BURSTS AND DAMAGE CAUSED BY BURSTS

RELATED U.S. APPLICATIONS

The present application claims priority from U.S. Provisional Application Ser. No. 61/499,888, filed on Jun. 22, 2011, and entitled "Spherical Mechanical Energy Accumulator to Reduce Bursts and Damage Caused by Bursts".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to kinetic energy storage systems for use in moving vehicles. More particularly, the present invention relates to energy storage systems utilizing an arrangement of three counter-rotating pairs of electromechanical flywheels for reducing and minimizing gyroscopic effects upon the moving vehicle. Even more particularly, the present invention relates to energy storage systems which are engineered to reduce bursts and to reduce damage caused by bursts.

2. Description of Related Art Including Information Disclosed Under 37 CFR 1.97 and 37 CFR 1.98.

While flywheels are well known in the art, there has been very little application of flywheels in moving vehicles. Some flywheels have been used in automobile engines to smooth out the pulses of energy provided by the exploding gases in the cylinders and to provide energy for the compression stroke of the pistons. However, flywheels have seldom been used for storage of kinetic energy within the automobile.

The reason for the lack of usage of flywheels as kinetic energy storers in automobiles has been the gyroscopic effect of the flywheel upon the maneuverability of the vehicle. A spinning flywheel produces a strong gyroscopic effect; in other words, the flywheel strongly opposes the turning of the vehicle. This gyroscopic effect is magnified where the flywheel is either large or spinning at high speeds.

It is highly desirable to utilize flywheel systems to store kinetic energy in moving vehicles since they can be loaded and energy drawn many times. For example, a train equipped with a kinetic energy storing flywheel could conserve a significant portion of that energy which was lost upon stopping the train. Similarly, the energy wasted in stopping an automobile could also be conserved and applied to accelerating the automobile or supplying the automobile with electrical power. Such a kinetic energy storage system could have vast applications in the fields of electric automobiles, hybrid automobiles, or other electrically powered vehicles.

The gyroscopic effect of a single flywheel arrangement clearly prohibits its widespread use as a kinetic energy storer in vehicles. If a single flywheel system were used to store much of the kinetic energy lost during the stoppage of a train, then the gyroscopic effect of the spinning flywheel could cause a train to derail every time it would go around a curve. Thus, it would be desirable to use a flywheel kinetic energy storing system without having to endure the undesirable characteristics of the gyroscopic effect.

One significant effort to achieve these benefits was found in U.S. Pat. No. 4,498,015, which issued on Feb. 5, 1985, to the present inventor. This device was a flywheel device for a moving vehicle that comprised a plurality of flywheel systems connected in such a manner as to minimize the gyroscopic effects of the flywheels. The flywheels were arranged such that they spin in axes that are ninety degrees from each other. In one embodiment of the invention, this was accomplished by attaching each flywheel to a separate shaft extending through opposing sides of a closed container. One shaft extends from the top to the bottom, another from side to side along the length of the enclosure, and the third from side to side along the width of the enclosure. Each of the shafts is freely rotatable within a ball bearing arrangement mounted in each side of the enclosure. The shafts are geared into one another such that the equally sized flywheels will spin at the same rate. This patent further proposed an alternative embodiment in which each of the flywheels was the rotor in an electric motor. The flywheel-rotor included integrated windings, magnets, and stator cores. Additionally, other techniques can be used such as hydraulic motor generators or pneumatic motor generators. The axes of these motors are arranged so as to be ninety degrees from each other. The electric motors were rigidly attached at a central area between them.

Unfortunately, this arrangement of flywheels was often difficult to configure so that all of the gyroscopic effects were eliminated. After a great deal of experimentation, it was found that the rotational movement of the flywheel, along each of the axes, still contributed gyroscopic effects. As such, a solution needed to be found as to how the minimize the gyroscopic effects along each axis.

In U.S. patent application Ser. No. 08/304,520, filed on Sep. 12, 1994, by the present inventor, and entitled "FLYWHEEL ENERGY STORAGE APPARATUS", now abandoned, a system was described which minimizes gyroscopic effects from the rotational movement of the flywheels. In particular, this system is an energy storage apparatus that has a housing, a pair of flywheels rotatable about a first axis within the housing, a second pair of flywheels rotatable about a second axis within the housing, a third pair of flywheels rotatable about a third axis within the housing, and an energy input means connected to at least one of the flywheels for initiating and maintaining rotational movement of the flywheels. An output energy device serves to convert the rotation of the flywheels into potential energy. Each of the first pair of flywheels rotates in opposite directions. Each of the second pair of flywheels is rotatable in opposite directions. Finally, each of the third pair of flywheels is rotatable in opposite directions. Each of the axes of the flywheel pairs are perpendicular to each other.

In this system, the energy input means was a motor-generator connected to each of the flywheels of the first, second and third pairs. Each of the flywheels has a shaft which extends centrally therefrom. The shaft is rotatable with the rotation of each of the flywheels. The motor-generator is connected to the shaft. In this system, the housing has a configuration of a sealed cube. Each of the flywheels is located adjacent a side of the cube. The housing has an interior which is maintained in a vacuum condition.

After experiments with that invention, it was found that these inventions strongly minimized the gyroscopic effects of the flywheels in the system. However, in actual use, there was the danger of injury caused by the flywheels spinning at a high speed. Under certain circumstances, in the event of an automobile accident or a collision when the flywheel disintegrates or bursts, pieces of the flywheel could come off of the spinning flywheel. The high speed at which the flywheel rotated created a dangerous condition whereby the flying pieces became the equivalent of flying shrapnel. As such, a need developed so as to create such an energy storage apparatus in which each of the flywheel components would automatically brake in the event of a collision.

It is further noted that with these prior systems, it is important to be able, under certain circumstances, to absorb the energy produced by such an apparatus. Adverse effects could be created by rigidly and fixedly mounting the housing of such an energy storage apparatus directly to a vehicle. The strong forces imparted by such a device could damage the structural integrity of the vehicle. Additionally, the flywheels housed in a cubic frame, when used in vehicles, are subject to possible disintegration or damage due to road shock and vibration. Such road shocks and vibrations must be absorbed in order to reduce any threat of damage to the flywheels, especially at higher vehicle and flywheel speeds. As such, a need developed so as to be able to reduce the shock and fatigue caused by the energy from road vibration and the shocks of bumps, holes and rocks as received by the vehicle during the normal driving movement of the vehicle.

U.S. Pat. No. 6,232,671, issued on May 15, 2001 to the present inventor, describes such a flywheel energy storage apparatus with a braking capability. Additionally, the patent addressed the problems of shock and fatigue, as well as the danger of shrapnel. The apparatus is designed for a vehicle that has a housing resiliently mounted in the vehicle. The apparatus has the pluralities of flywheels rotatable about separate axes within the housing. There is an energy input mechanism connected to one of the flywheels for initiating and maintaining rotational movement of the flywheels. An output mechanism converts the rotation of the flywheels into potential energy. Each of the flywheels of the first, second and third pairs are rotatable in opposite directions. Each of the axes are perpendicular to each other. A cradle is connected to the vehicle so as to receive the housing within the cradle. The flywheel system is designed to be safe, yet portable, as an electro-mechanical battery. The housing is in the shape of a cube. The housing has a braking capability, and is designed so as to reduce the amount of shrapnel released in the event of an accident. The integrity of the flywheel system was accomplished through the use of a stainless steel mesh formed around the housing. Additionally, a latex layer was formed beneath the stainless steel mesh, which added to both the strength and flexibility of the flywheel system.

U.S. Provisional Patent Application Ser. No. 61/158,955, filed on Mar. 10, 2009 by the present invention describes a flywheel system. In this application, another system was described which minimizes gyroscopic effects from the rotational movement of the flywheels. The system describes a mechanical energy accumulator having a spherical housing and three pairs of flywheels. The first pair of flywheels is rotatable about a first axis within the housing. The second pair of flywheels is rotatable about a second axis within the housing. The third pair of flywheels is rotatable about a third axis within the housing. The accumulator also has six flywheel lids affixed onto the spherical housing over each of the flywheels. The mechanical energy accumulator is gyroneutral.

It is an object of the present invention to provide an energy storage apparatus which reduces and minimizes gyroscopic effects.

It is another object of the present invention to provide an energy storage apparatus that utilizes permanent magnet motors.

It is another object of the present invention to provide a long life energy storage apparatus that can be utilized within vehicles without diminishing the maneuverability of the vehicle.

It is another object of the present invention to provide an energy storage apparatus that allows for the production of electrical energy, rather than mechanical energy.

It is a further object of the present invention to provide a flywheel energy storage apparatus which reduces burst potential.

It is yet another object of the present invention to provide a flywheel energy storage apparatus which reduces damage caused by bursts.

It is yet another object of the present invention to provide a flywheel energy storage apparatus which minimizes interior friction.

It is a further object of the present invention to provide a flywheel energy storage device which reduces the potential for damage and destruction in the event of an accident or in the event of a damaging occurrence.

It is still a further object of the present invention to provide a flywheel energy storage apparatus which reduces the effect of road shock and vibration upon the flywheel system.

It is another object of the present invention to provide a flywheel system which operates with other flywheel systems, other batteries or other engines.

These and other objects and advantages of the present invention will become apparent from a reading of the attached specification and appended claims.

BRIEF SUMMARY OF THE INVENTION

The present invention is an apparatus comprising a spherical housing, a first pair of flywheel assemblies rotatable about a first axis within the spherical housing, a second pair of flywheel assemblies about a second axis within the spherical housing, and a third pair of flywheel assemblies rotatable about a third axis within the spherical housing. Each of the flywheel assemblies of the first pair of flywheel assemblies and the second pair of flywheel assemblies and the third pair of flywheel assemblies having at least one permanent magnet motor therein. Each flywheel assembly of the first pair are rotatable in opposite directions. Each flywheel assembly of the second pair is rotatable in opposite directions. Each flywheel assembly of the third pair is rotatable in opposite directions. Each of the first, second and third axes are perpendicular to each other.

In the present invention, an energy input means is connected to at least one of the flywheel assemblies for initiating and maintaining rotational movement of the flywheels, and an output means is provided for converting the rotation of the flywheel assemblies into potential energy. Each of the flywheel assemblies includes a double conical flywheel base, a motor-generator suitable for driving the double conical flywheel base, a flywheel lid covering the motor-generator. A respective exterior surface of each of the flywheel lids is mounted flush with an surface exterior of the spherical housing. The spherical housing may have a convergence support at a center thereof. The motor-generator may be a DC brushless motor-generator having at least one rotor, the rotor being secured with pin-and-jewel bearings to the motor-generator.

In the present invention, a first plurality of windings may positioned around a first side of the spherical housing, and a second plurality of windings may be positioned around a second side of the spherical housing. The first plurality of windings have a greater retention strength and/or number of windings than a retention strength and/or number of windings said second plurality of windings.

The spherical housing may be positioned within a shell having a first shell portion, a second shell portion, and an expansion member having a first side affixed to the first shell portion and a second side affixed to the second shell portion.

The present invention is also a mechanical energy accumulator for mounting inside a vehicle. The accumulator includes a shell comprising having a first shell portion, a second shell portion, and an expansion member affixed to the first shell portion and second shell portion so as to allow the shell portions to move away from each other in the event of a burst from within the shell. A spherical flywheel assembly is provided which has a plurality of flywheels positioned therein. The spherical flywheel assembly is positioned within the shell. The expansion member may have an accordion configuration. A latex filling is provided within an interior of the shell.

The present invention is also an apparatus comprising a vehicle, a shell resiliently mounted in said vehicle, and a spherical flywheel assembly mounted in an interior of the shell. The shell includes a first shell portion, a second shell portion, and an expansion member affixed to the first shell portion and affixed to the second shell portion.

In the present invention, the spherical housing has a plurality of shock knobs affixed to an exterior surface thereof. The plurality of shock knobs have respective ends abutting an interior surface of the shell so as to suspend the spherical housing within the shell.

The foregoing section is intended to describe, in generality, the preferred embodiments of the present invention. It is understood that variations in the present invention can be made within the scope of the present invention. As such, this section should not be construed, in any way, as limiting of the scope of the present invention. The present invention should be only be limited by the following claims and their legal equivalents.

DETAILED DESCRIPTION OF THE INVENTION

Figure 1:
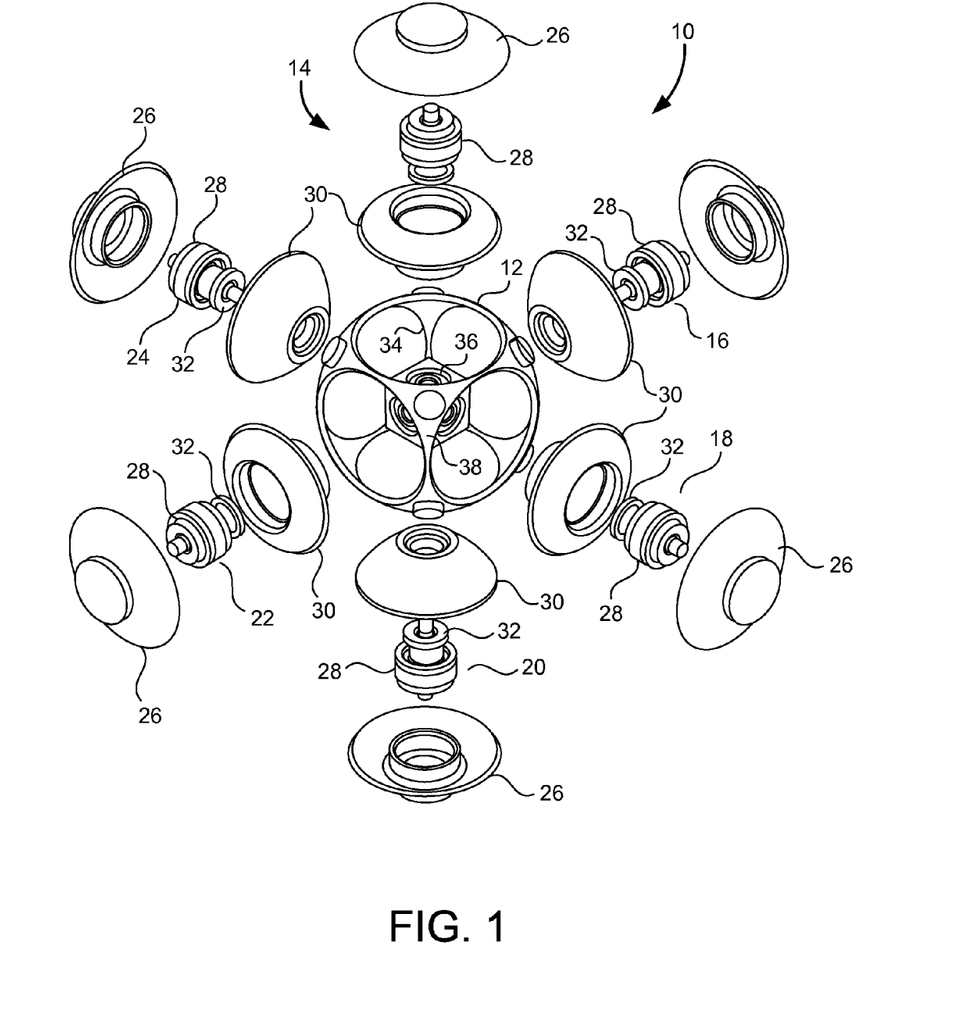
FIG. 1 is an exploded view of the mechanical energy accumulator apparatus of the present invention.

Referring to FIG. 1, there is shown an exploded view of the mechanical energy accumulator 10 of the present invention. The mechanical energy accumulator 10 has a generally spherical-shaped housing 12. The spherical-shaped housing 12 accommodates six flywheel assemblies. The flywheel assemblies are double coned, composite flywheels. Each flywheel integrates its own motor-generator. In FIG. 1, there is shown the first flywheel assembly 14, second flywheel assembly 16, third flywheel assembly 18, fourth flywheel assembly 20, fifth flywheel assembly 22, and sixth flywheel assembly 24. Each of the flywheel assemblies are counter rotating and grouped in pairs. First flywheel assembly 14 is paired with fourth flywheel assembly 20, second flywheel assembly 16 is paired with fifth flywheel assembly 22, and third flywheel assembly 18 is paired with sixth flywheel assembly 24. The flywheel pairs are counter rotating, with first flywheel assembly 14 rotating in a direction opposite the direction that the fourth flywheel assembly 20 rotates in. Similarly, second flywheel assembly 16 rotates in a direction opposite that of fifth flywheel assembly 22, and third flywheel assembly 18 rotates in a direction opposite that of sixth flywheel assembly 24.

Each of the flywheel assemblies includes a conical cap 26, a motor-generator 28, and a conical base 30. When assembled, each of the flywheel caps 26 fit flush with the exterior of the spherical housing 12. The spherical housing 12 has inner support structure 34 and a convergence support 36. The inner support structure 34 maintains the structure of the housing 12 and the housing wall 38. The convergence support 36 is shown in the center of the spherical housing 12. The convergence support 36 is at a point where the conical bases 30 meet in the center of the spherical housing 12. The convergence support 36 defines the axes about which the pairs of flywheel assemblies rotate.

Each of the flywheel assemblies has a motor-generator 28 therein. The motor-generator 28 is DC brushless water cooled motor-generator 28. Rotors of the motor-generator 28 are held in place by pin and jewel bearings 32. Additionally, the rotors are held in place by magnetic repulsion with permanent magnets. The pin and jewel 32 bearings center the floated flywheel assemblies by magnetic repulsion. The jewel is mounted in rubber to reduce shock, and the lubrication is good for many years.

In the present invention, two very strong, quality magnets, eliminate the electro magnet for an identical rotor magnet mounted on the frame or lid. The magnet is permanent magnet as commercial permanent magnet technologies have improved. Previously, electro-magnets were used instead of permanent magnets because they were the only option to build up the required magnetic field, both to elevate a heavy flywheels as well as provide power between the rotor mass so as to float the flywheel through its dynamics of rotation at very low friction. In the present invention, two strong doughnut type magnets per shafts are used. The magnets are of superior strength and can float the entire rotor assembly for optimum friction-free high-speed rotation. The use of permanent magnets also reduces the electric load of the apparatus by eliminating the electro-magnet.

The interior of the housing 12 should be in a vacuum condition so as to minimize any friction through the rotation of the flywheels within the interior of the housing 12. This vacuum condition can be created by the use of a commercial vacuum pump acting on the interior of the housing 12. The housing 12, along with its associated components, is to be positioned within the interior of a vehicle. The mechanical energy accumulator 10 of the present invention is contemplated for use in conjunction with a bus. However, all vehicles or vessels can be included, including spacecraft. The mechanical energy accumulator 10 of the present invention would work best in space due to the vacuum condition of space itself. Additionally, the mechanical energy accumulator 10 of the present invention can be used outside of vehicles.

The housing 12 has a configuration of a sealed sphere or ball. This shape allows for a more efficient use of the volume of the mechanical energy accumulator 10. With the flywheels formed in a double conical configuration, most of the space within the housing 12 is utilized. Each of the flywheels has a lower cone section which converges toward the center of the housing and an upper cone section which follows the curved wall of the housing.

Figure 2:
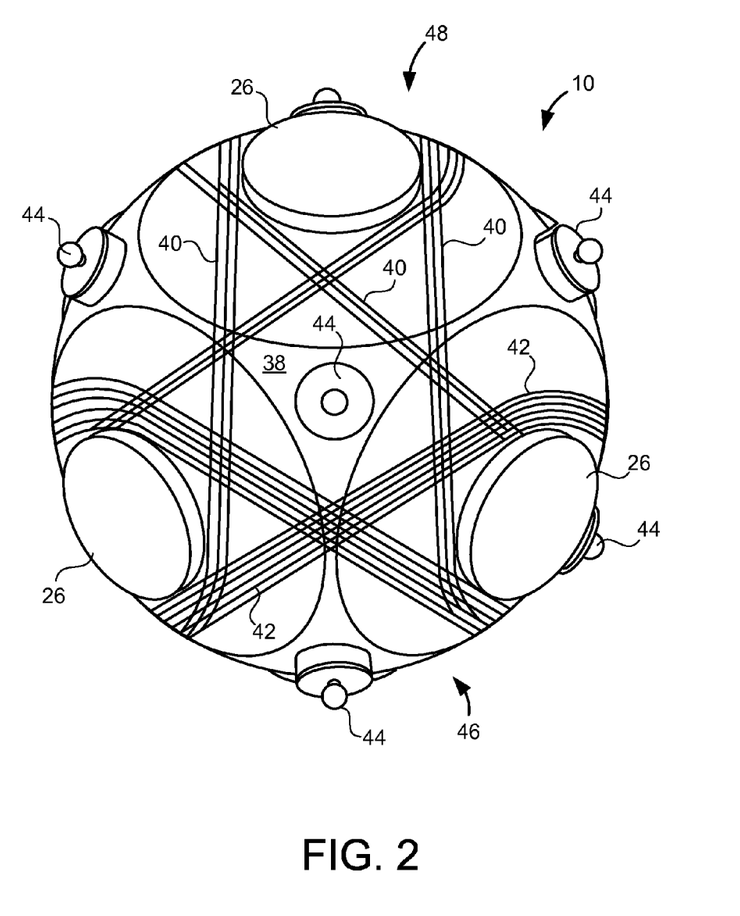
FIG. 2 is a view of the mechanical energy accumulator apparatus showing shock knobs and wire winding on the outside of the apparatus.

Referring to FIG. 2, there is shown a view of the mechanical energy accumulator 10 in assembled form having a winding thereon. In FIG. 2 it can be seen that the perimeters of the flywheel caps 26 fit flush with the housing wall 38 of the spherical housing 12. Additionally, in FIG. 2 there are shown shock knobs 44. The shock knobs 44 extend outwardly from the housing wall 38 of the spherical housing 12. The shock knobs 44 are electronic pressure circuits for detection and suspension of the mechanical energy accumulator 10. The shock knobs 44 also serve as mounting points for an outer shell. The shock knobs 44 are spring mounted on a rounded shaft. The shock knobs 44 allow the mechanical energy accumulator 10 to be mounted on a second outer suspension sphere whereby the mechanical energy accumulator 10 can be made portable for the use in vehicles.

Importantly, in FIG. 2 there is shown various windings which support the six flywheel caps 26. These windings are bound with steel cable and are hot mounted. The various windings include three strand windings 40 and six strand windings 42. The configuration of the three strand windings 40 and the six strand windings 42 serve to create a strong side 46 and weak side 48 of the mechanical energy accumulator 10 of the present invention. This new concept is based on the idea of a controlled burst. In the case of a burst in the mechanical energy apparatus 10, the weak side 48 would be the first to burst. In the case of a burst, the weak side 48, having the weaker three strand windings 40, will expand and the pressure of the burst will defeat the weaker three strand winding 40, rather than the stronger side 46 having six strand windings 42. The number and type of windings can of course vary, however there will be a strong side 46 having windings with a greater retention strength that the windings of the weak side 48. Thus, the direction of the burst is controlled. In addition to the use of the windings, the initial burst can be subdued due to inherent and artificial slow down measures, these measures include the counter rotating flywheels and mass. The counter rotating flywheels cancel each other out. The motors may also be reversed in order to avoid a burst.

Figure 3:
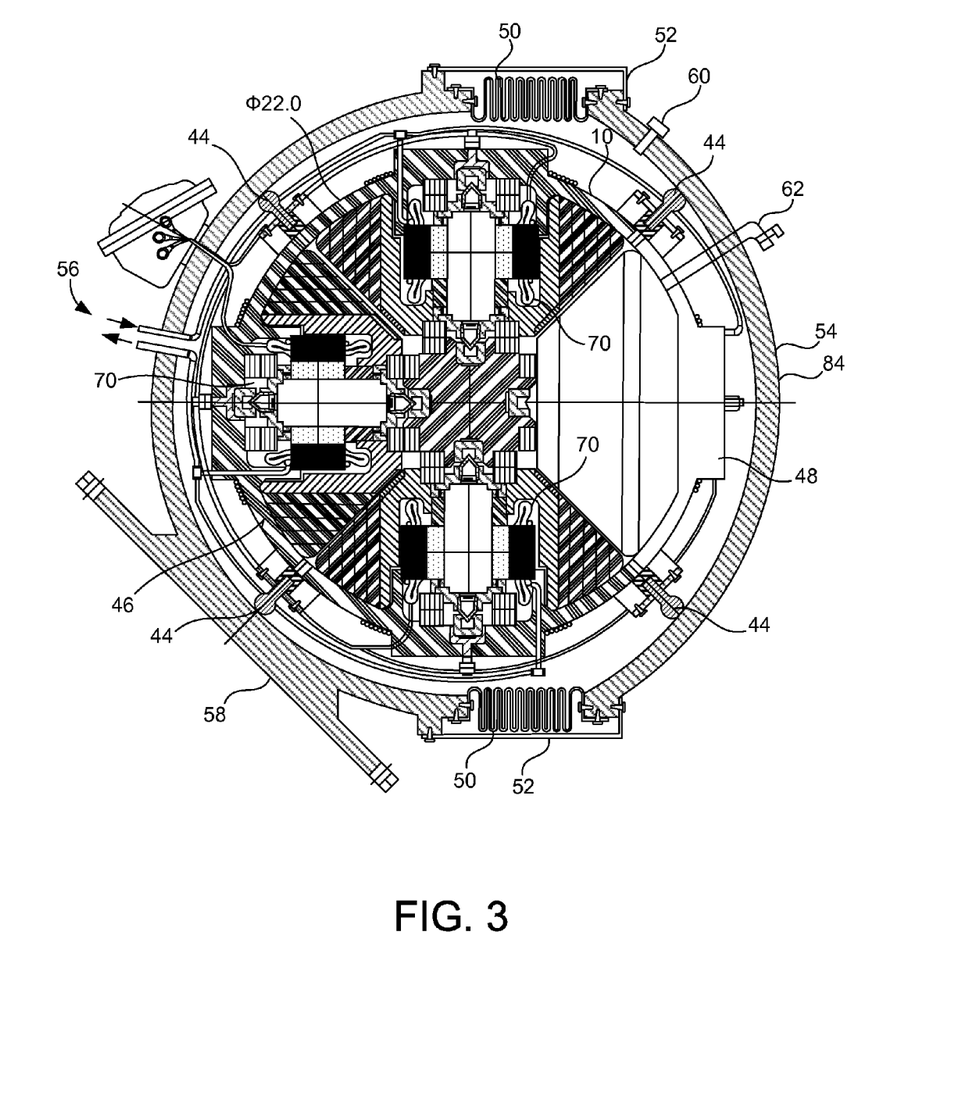
FIG. 3 is a cross sectional view of the mechanical energy accumulator apparatus of the present invention with an outer shell therearound.

Referring to FIG. 3, there is shown a cross sectional view of the mechanical energy accumulator of the present invention enclosed in an outer shell 54. FIG. 3 incorporates many of the elements previously shown in the previous provisional patent application and in the inventor's previous patent. Importantly, in FIG. 3 there is shown the outer shell 54. The outer shell 54 completely encloses the mechanical energy accumulator 10 of the present invention. The outer shell 54 includes an expansion member 50 and a steel cover 52. The outer shell 54 is formed of two halves between which the extension member 50 is placed. The expansion member 50 is also referred to as a "burst bag." The weak side 48 of the mechanical energy accumulator 10 is shown on the right side of FIG. 3. The strong side 46 of the mechanical energy accumulator 10 is shown on the left side of FIG. 3. In the event of a burst, the weak side 48 would be the side that would expand.

Upon expansion, the steel cover 52 on the outer shell 54 would break off. After the steel over 52 breaks off, the expansion member 50 expands. The expansion of the expansion member 50 allows for the mechanical energy accumulator 10 to burst, and the exterior side 64 of the outer shell 54 moves outwardly as the expansion member 50 expands.

Also shown in FIG. 3 is the mount 58. The shock knobs 44 are in contact with the inner side of the outer shell 54. A cavity exists between the outer shell 54 and the mechanical energy accumulator 10. The cavity can be filled with a latex-type fluid through a latex inlet 60. By the filling the cavity with a latex-type fluid, greater shock absorbency is accomplished. The latex filling in the cavity also helps to accomplish the vacuum seal. The vacuum within the mechanical energy accumulator 10 is accomplished by using the vacuum line and valve 62 shown extending outwardly of the outer shell 54 which are in communication with the interior of the mechanical energy accumulator 10. Also shown in FIG. 3 are the water coolant lines 56 running in and out of the outer shell 54 and in communication with the various flywheel assemblies 70 within the mechanical energy accumulator 10. The expansion member 50 is in the form of an expandable folded up metal cloth which is folded up like a round accordion.

When the mechanical energy accumulator 10 is in final assembly, and all ducts have been sealed and connected securely, and all electric cables have been spliced and connected securely, then the rotors must be centered and the magnetic field fine tuned to floatation. The weight load must taken off both ends of the pin and jewel bearings. In order to accomplish this, a double nut tightening on a bold extending off the outside bearing is utilized. This is adjusted against a strong spring washer between the frame and the jewel section. The adjustment provision will allow precision centering for optimum long life operation. The adjustment will be dimensioned to allow fine tuning of the suspension by easing the spring washer, to perfect the spaces of both magnetic and pin and jewel fit. To seal this adjustor as per a strong vacuum pressure, two measures are used. First, the use of a plastic liquid, such as "lock-tight" that dries into a solid of sufficient strength. The second being latex like rubberized mounting in a semi liquid state, that dries strong and seals after the adjustments are concluded.

Figure 4:
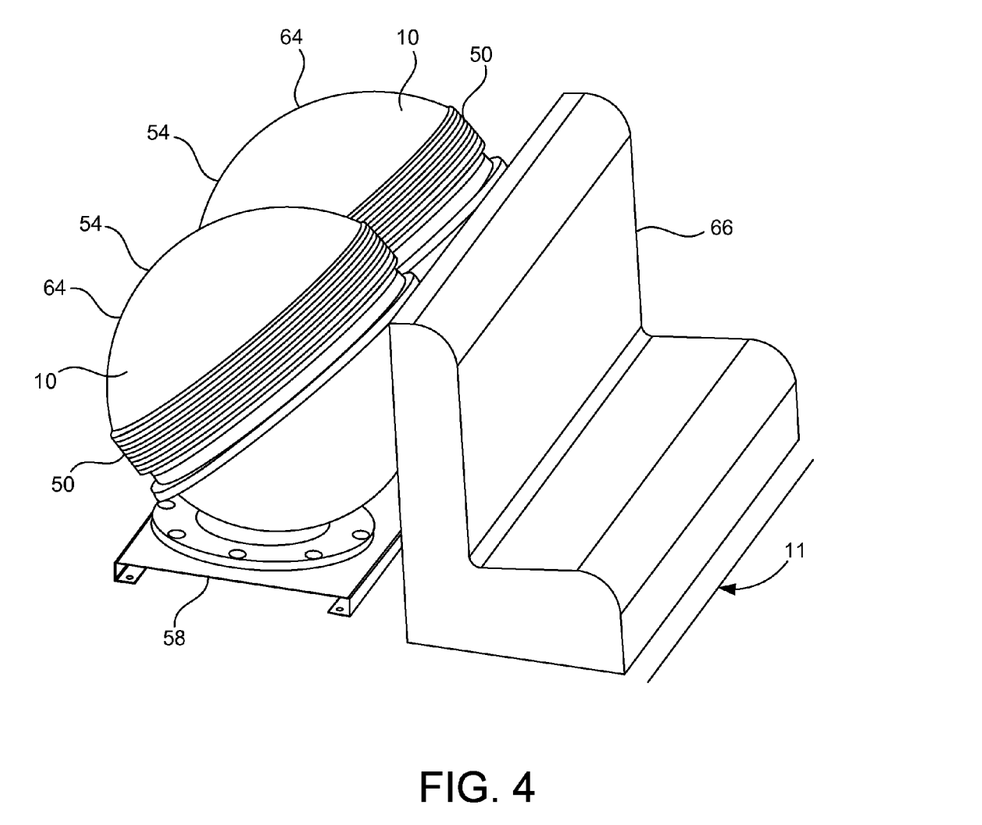
FIG. 4 is a perspective view of the mechanical energy accumulator apparatus with burst bags being mounted behind the backseat of a vehicle.

Referring to FIG. 4, there is shown a view of the mechanical energy accumulator 10 mounted in a vehicle 11. In FIG. 4, two mechanical energy accumulators 10 are positioned within two outer shells 54. The two outer shells 54 are soft mounted 58 to the structure behind the backseat 66 of a vehicle. The vehicle can be a sedan, van, bus, tram, or other vehicle. The mechanical energy accumulators 10 are mounted such that the outer side 64 of the outer shells 54 are turned away from the backseat 66 of the vehicle. This positioning is such that during the event of a burst, the outer shells 54 of the mechanical energy accumulators 10 expand away from the backseat 66 where a passenger may be sitting. In FIG. 4, it can be seen that the expansion members 50 extend around equatorial lines of the mechanical energy accumulators 10.

Figure 5:
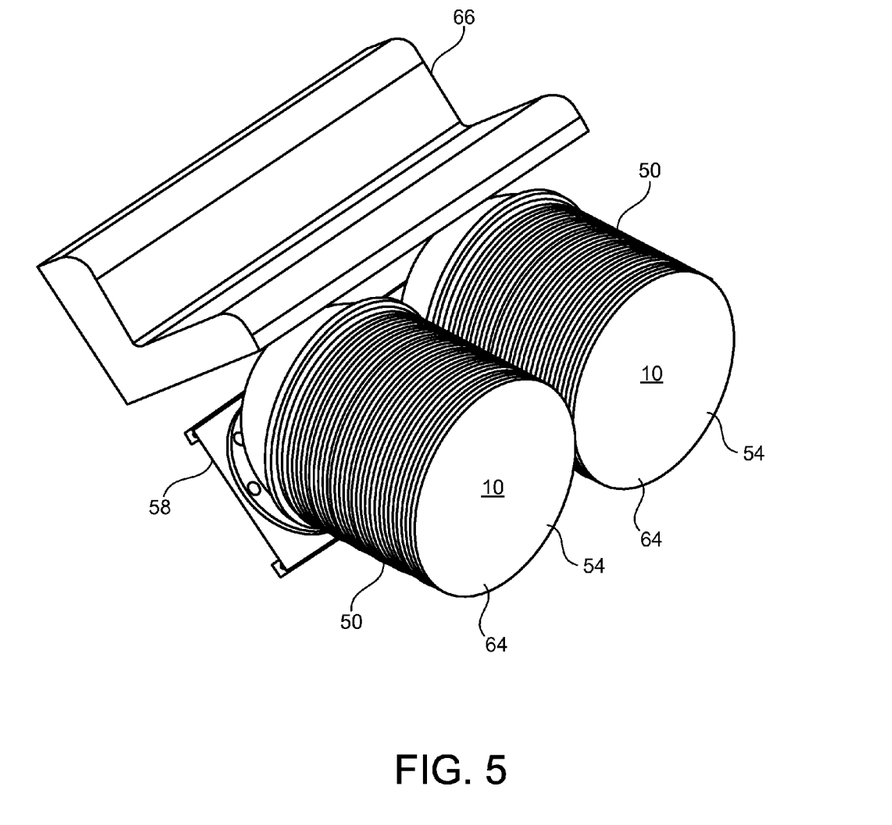
FIG. 5 shows a perspective view of the mechanical energy accumulator apparatus of the present invention showing the burst bags being in a deployed condition.

Referring to FIG. 5, there is shown a perspective view of two mechanical energy accumulators 10 mounted in a vehicle after a burst. As shown, a burst has occurred and the expansion members 50 have moved to an expanded position similar to an expanded accordion. Thus, the outer shell 54 has contained the debris associated with a burst, and injury to passengers has been prevented as the outer shell 54 has expanded away from the backseat 66 of the vehicle.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus comprising:
a spherical housing;
a first pair of flywheel assemblies rotatable about a first axis within said spherical housing;
a second pair of flywheel assemblies about a second axis within said spherical housing;
a third pair of flywheel assemblies rotatable about a third axis within said spherical housing, each of the flywheel assemblies of said first pair of flywheel assemblies and said second pair of flywheel assemblies and said third pair of flywheel assemblies having at least one permanent magnet motor therein, each flywheel assembly of said first pair being rotatable in opposite directions, each flywheel assembly of said second pair being rotatable in opposite directions, each flywheel assembly of said third pair being rotatable in opposite directions, each of said first, second and third axes being perpendicular to each other;
a first plurality of windings positioned around a first side of said spherical housing; and
a second plurality of windings positioned around a second side of said spherical housing, said first plurality of windings having a greater retention strength than a retention strength of said second plurality of windings.

2. The apparatus of claim 1, further comprising:
an energy input means connected to at least one of the flywheel assemblies for initiating and maintaining rotational movement of the flywheels; and
an output means for converting the rotation of the flywheel assemblies into potential energy.

3. The apparatus of claim 1, each of said flywheel assemblies comprising:
a double conical flywheel base;
a motor-generator suitable for driving said double conical flywheel base; and
a flywheel lid covering said motor-generator.

4. The apparatus of claim 3, a respective exterior surface of each of the flywheel lids being mounted flush with an surface exterior of said spherical housing.

5. The apparatus of claim 3, said motor-generator being a DC brushless motor-generator having at least one rotor, the rotor being secured with pin-and-jewel bearings to said motor-generator.

6. The apparatus of claim 1, said spherical housing having a convergence support at a center thereof.

7. The apparatus of claim 1, said spherical housing being positioned within a shell, said shell comprising:
a first shell portion;
a second shell portion; and
an expansion member having a first side affixed to said first shell portion and a second side affixed to said second shell portion.

8. A mechanical energy accumulator for mounting inside a vehicle comprising:
a shell comprising:
a first shell portion;
a second shell portion;
an expansion member affixed to said first shell portion and affixed to said second shell portion so as to allow the shell portions to move away from each other in the event of a burst from within said shell;
a spherical flywheel assembly having a plurality of flywheels positioned therein, said spherical flywheel assembly being positioned within said shell;
a first plurality of windings positioned around a first side of said spherical housing; and
a second plurality of windings positioned around a second side of said spherical housing, said first plurality of windings having a greater retention strength than a retention strength of said second plurality of windings.

9. The mechanical energy accumulator of claim 8, said plurality of flywheels of said spherical flywheel assembly comprising:
a spherical housing;
a first pair of flywheel assemblies rotatable about a first axis within said spherical housing;
a second pair of flywheel assemblies about a second axis within said spherical housing; and
a third pair of flywheel assemblies rotatable about a third axis within said spherical housing, each of the flywheel assemblies of said first pair of flywheel assemblies and said second pair of flywheel assemblies and said third pair of flywheel assemblies having at least one permanent magnet motor therein, each flywheel assembly of said first pair being rotatable in opposite directions, each flywheel assembly of said second pair being rotatable in opposite directions, each flywheel assembly of said third pair being rotatable in opposite directions, each of said first, second and third axes being perpendicular to each other.

10. The mechanical energy accumulator of claim 9, each of said flywheel assemblies comprising:
a double conical flywheel base;
a motor-generator suitable for driving said double conical flywheel base; and
a flywheel lid covering said motor-generator.

11. The mechanical energy accumulator of claim 8, said expansion member having an accordion configuration.

12. The mechanical energy accumulator of claim 8, further comprising:
a latex filling within an interior of said shell.

13. An apparatus comprising:
a vehicle;
a shell resiliently mounted in said vehicle, said shell comprising:
a first shell portion;
a second shell portion; and
an expansion member affixed to said first shell portion and affixed to said second shell portion, said expansion member having an accordion configuration;
a spherical flywheel assembly mounted in an interior of said shell;
a first plurality of windings positioned around a first side of said spherical housing; and
a second plurality of windings positioned around a second side of said spherical housing, said first plurality of windings having a greater retention strength than a retention strength of said second plurality of windings.

14. The apparatus of claim 13, said spherical flywheel assembly comprising:
a spherical housing;
a first pair of flywheel assemblies rotatable about a first axis within said spherical housing;
a second pair of flywheel assemblies about a second axis within said spherical housing; and
a third pair of flywheel assemblies rotatable about a third axis within said spherical housing, each of the flywheel assemblies of said first pair of flywheel assemblies and said second pair of flywheel assemblies and said third pair of flywheel assemblies having at least one permanent magnet motor therein, each flywheel assembly of said first pair being rotatable in opposite directions, each flywheel assembly of said second pair being rotatable in opposite directions, each flywheel assembly of said third pair being rotatable in opposite directions, each of said first, second and third axes being perpendicular to each other.

15. The apparatus of claim 14, said spherical housing having a plurality of shock knobs affixed to an exterior surface thereof, said plurality of shock knobs having respective ends abutting an interior surface of said shell so as to suspend said spherical housing within said shell.

\* \* \* \* \*